United States Patent [19]

Magyar

[11] 4,149,737
[45] Apr. 17, 1979

[54] SEAT BELT RETRACTOR INSTALLATION

[75] Inventor: Joseph J. Magyar, Rochester, Mich.

[73] Assignee: General Motors Corporation, Detroit, Mich.

[21] Appl. No.: 799,451

[22] Filed: Jul. 25, 1977

[51] Int. Cl.² .......................................... B60R 21/10
[52] U.S. Cl. .................................. 280/744; 280/747
[58] Field of Search ................ 280/744, 747; 403/353; 242/107.4 R, 107.4 A, 107.7; 297/388

[56] References Cited

U.S. PATENT DOCUMENTS

| 3,312,443 | 4/1967 | Levigne | 403/353 |
| 3,948,460 | 4/1976 | Kondziola | 214/107.4 A |

Primary Examiner—Robert R. Song
Attorney, Agent, or Firm—Charles E. Leahy

[57] ABSTRACT

A seat belt retractor housing is mounted on a vehicle body structural member by integral load-bearing tangs struck from the housing frame for insertion through aligned apertures of the structural member. The apertures are defined by load-bearing walls which may be reinforced by a reinforcement plate having aligned load-bearing walls. A nonload-bearing positioning means such as a self-tapping screw acts between the retractor housing and the structural member to maintain the load-bearing tangs of the retractor housing in proximity with the load-bearing walls of the structural member for load-transmitting engagement therewith when the seat belt load is transmitted to the housing by lockup of a retractor reel. Accordingly, the retractor is anchored against movement relative the structural member independently of the load-bearing capacity provided by the self-tapping screw or like positioning means.

4 Claims, 4 Drawing Figures

SEAT BELT RETRACTOR INSTALLATION

The invention relates to a motor vehicle seat belt retractor and more particularly provides a simplified installation of such a retractor on a load-bearing member of a vehicle body.

Conventional prior art seat belt retractors have a stamped sheet metal housing which mounts a rotatable reel for winding and unwinding a seat belt. A locking mechanism is provided to selectively move a lock bar into engagement of the reel to block belt unwinding and thereby restrain a seated occupant against movement from the seat. The occupant restraining load on the seat belt is transmitted to the reel and then to the housing of the seat belt retractor. Accordingly, the housing of the seat belt retractor must be securely attached to a load-bearing structural member of the vehicle body. This connection is conventionally made by a bolt or bolts which extend through aligned apertures of the retractor housing and the vehicle body structural member and are secured by a nut. The mounting bolts and nuts must have sufficient shear and tensile strength to sustain the seat belt load which must be transmitted from the retractor housing to the structural member.

One such prior art retractor mounting arrangement is shown in U.S. patent Kondziola, U.S. Pat. No. 3,948,460, wherein the lower end of the retractor housing is attached to the support member by a load-bearing nut and bolt while the upper end of the retractor is secured against rotation by a flange on the retractor housing which extends into an aperture of the body structural member.

According to the present invention, a seat belt retractor housing has at least one integral load-bearing tang struck therefrom for insertion through an aperture defined by a load-bearing wall of the vehicle body structural member. The aperture of the structural member is defined by a load-bearing wall which may be reinforced if necessary by a reinforcement plate having an aligned aperture. A nonload-bearing positioning means such as a self-tapping screw acts between the retractor housing and the structural member to maintain the load-bearing tang of the retractor housing in proximity with the load-bearing wall of the structural member for load-transmitting engagement therewith when the seat belt load is transmitted to the housing by lockup of the reel. Accordingly, the retractor is anchored against movement relative the structural member independently of load-bearing capacity provided by the self-tapping screw or like positioning means.

One object, feature and advantage of the invention is the installation of a retractor housing member on a vehicle body structural member by the provision of interlocking projecting elements and receptacles on the members to transmit seat belt loads from the retractor housing member to the structural member and a separate nonload-bearing attaching means acting therebetween to maintain the interlocked projecting elements and receptacles in load-sustaining engagement.

Another object, feature and advantage of the invention is the provision of a seat belt retractor having a housing with at least one projection struck therefrom for engagement in an aperture of a body structural member and a nonload-bearing positioning means acting to retain the housing projection in load-bearing engagement of the structural member.

A further object, feature and advantage of the invention is the provision of a seat belt retractor housing having a pair of spaced apart integral load-bearing tangs lanced therefrom for insertion through the opening of a vehicle body structural member and a nonload-bearing attaching means acting to maintain the load-bearing tangs of the retractor frame in load-transmitting engagement with load-bearing walls of the vehicle body structural member.

These and other objects, features and advantages of the invention will become apparent upon consideration of the specification and the appended drawings in which.

Figure 1:
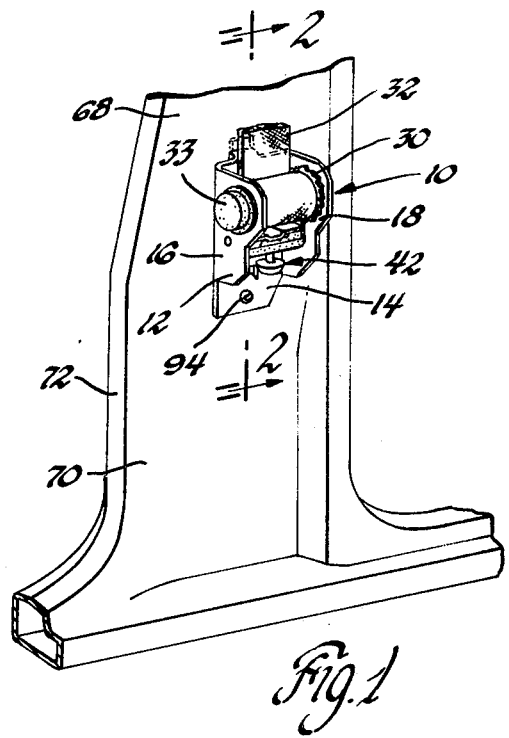
FIG. 1 is a perspective view of a vehicle body door pillar having a seat belt retractor mounted thereon.
Figure 2:
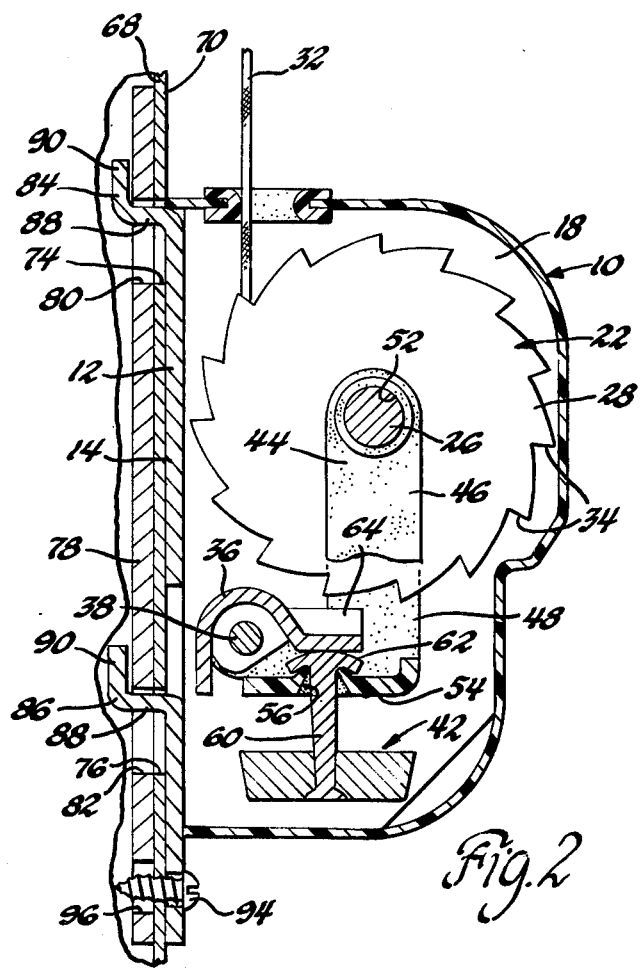
FIG. 2 is a side elevation sectional view taken in the direction of arrows 2—2 of FIG. 1.

Referring to FIGS. 1 and 2 of the drawings, a vehicle occupant restraint belt retractor is generally indicated by 10 and includes a stamped sheet metal retractor housing 12. The housing 12 includes a base wall 14 and a pair of spaced parallel sidewalls 16 and 18 which are formed integral with the base wall 14. A belt reel, generally designated 22, includes a reel shaft 26 having its ends rotatably journalled in the sidewalls 16 and 18. A pair of spaced apart ratchet wheels 28 and 3 are secured on the ends of the reel shaft 26 adjacent the sidewalls 16 and 18. A seat belt 32 has its end attached to the reel shaft 26 and is wound thereon between the ratchet wheels 28 and 30 upon counterclockwise rotation of the reel by a winding spring which is concealed beneath a plastic cover 33. The ratchet wheels 28 and 30 have ratchet teeth 34 which face in the belt unwinding direction of reel rotation.

A lock bar 36 is mounted on a pivot shaft 38 which extends between the sidewalls 16 and 18. The lock bar 36 is moved between an unlocking position of FIG. 2 and a locking position by an inertia actuated pendulum indicated generally at 42. The pendulum 42 is supported by an injection molded plastic pendulum support 44 having laterally spaced sidewalls 46 and 48 respectively juxtaposed with the sidewalls 16 and 18 and having apertures 52 which receive the reel shaft. The plastic support 44 also includes a pendulum support portion 54 which bridges the space between the sidewalls 46 and 48 and has a central aperture 56 which receives a stem 60 of the pendulum 42. The stem 60 mushrooms outwardly about the pendulum support portion 54 to provide a control head 62 which supports the lock bar 36 at its normal rest position.

In operation, the pendulum 42 swings from its vertically depending orientation of FIG. 2 to inclined position in response to a predetermined level of vehicle acceleration or deceleration. This swinging movement of the pendulum 42 causes the pendulum control head 62 to pivot and thereby move the lock bar 36 upwardly so that lock teeth 64 provided thereon are carried into locking engagement of the ratchet teeth 34 of ratchet wheels 28 and 30. Accordingly, the belt 32 is blocked from being unwound and the occupant is restrained by the belt. The load imposed on the belt by the momentum of the occupant is transmitted into the retractor housing 12.

The seat belt retractor 10 is mounted on the door pillar structural member 68 of the vehicle body or other suitable conveniently located load-bearing structural member. The door pillar structure includes an inner panel 70 and an outer panel 72 having edge flanges which are welded together. As best seen in FIG. 2, the inner panel has a pair of vertically spaced receptacles or apertures 74 and 76. The inner panel 70 is reinforced by a reinforcement plate 78 which is welded thereto and has apertures 80 and 82 aligned respectively with the apertures 74 and 76 of the inner panel 70.

The base wall 14 of the retractor housing 12 has a pair of vertically spaced integral mounting projections or tangs 84 and 86 struck therefrom for insertion through the apertures 74 and 76 of the inner panel 70. Each of the tangs includes a leg 88 which extends normally from the base wall 14 and a vertically upstanding leg 90. The length of the upstanding leg 90 is somewhat less than the vertical extent of the apertures 74 and 76 to provide an access opening for insertion of the tangs through the apertures of the structural member 68 to position the base wall 14 into engagement of the inner panel 70. The retractor 10 is then thrust vertically upward causing the vertical upstanding legs 90 of the tangs 84 and 86 to overlie the inner surface of the reinforcing plate 78. The lateral extent of the perpendicular legs 88 is selected to provide a spacing between the base wall 14 and the vertical upstanding legs 90 which closely fits the combined thickness of the inner panel 70 and reinforcement plate 78 but does not interfere with assembly of the retractor 10 to inner panel 70. When the retractor has been moved upwardly to the position of FIGS. 2 and 3, a positioning means such as a self-tapping screw 94 is employed to attach the base wall 14 to the inner panel 70 to hold the retractor 10 in its position of FIGS. 2 and 3 wherein the tang legs 88 abut the walls defining apertures 74 and 76 and the vertical upstanding legs 90 overlie the face of reinforcement 78. The reinforcement plate 78 may be provided with a clearance aperture 96 so that the self-tapping screw 94 threadedly engages only the structural member 68. The self-tapping screw 94 need not have a force sustaining capability beyond that required to hold the retractor 10 in its position of FIGS. 2 and 3 since the tangs 84 and 86 will transmit the seat belt loads from the retractor housing 12 to the structural member 68.

Figure 4:
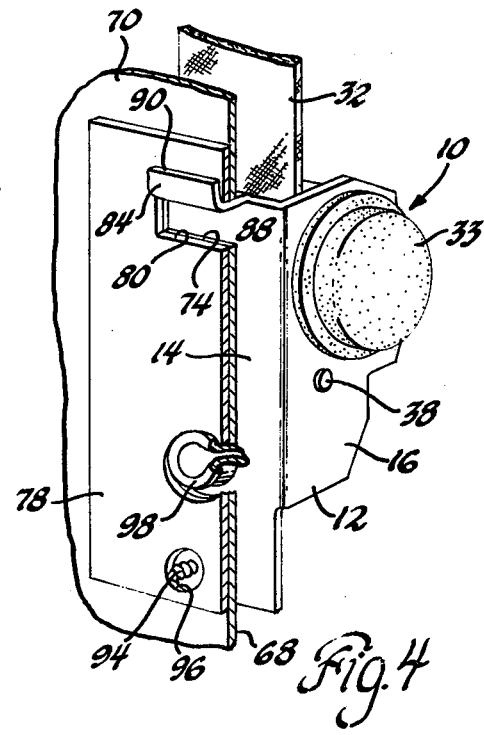
FIG. 4 is a view similar to FIG. 3 but showing a modification of the invention.

Referring to FIG. 4, there is shown a modification of the invention wherein a tang 84 is provided at the upper end of the seat belt retractor and flanged structure 98 is provided at the lower end of the retractor. The flanged structure 98 is stamped to define a circumferential embossment and is engaged in a circular aperture of the structural member to anchor the lower end of the retractor against vertical or swinging movement.

Figure 3:
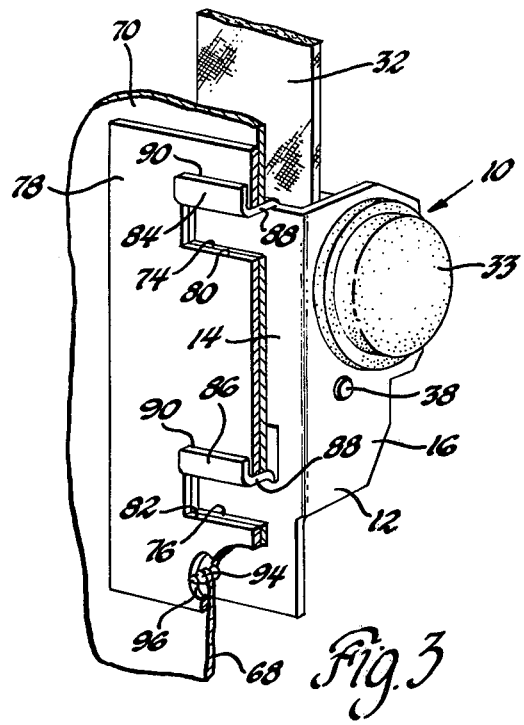
FIG. 3 is an enlarged perspective view similar to FIG. 1 but showing the opposite face of the seat belt retractor.

Referring to FIGS. 2 and 3, it will be understood that the belt 32, depending on the angle of departure of the belt 32 from the reel 22, applies a clockwise movement to the retractor which would tend to pull at least the upper end of the retractor housing away from the inner panel 70. Accordingly, the tang 84 and its upstanding vertical leg 90 must have sufficient strength to withstand such force.

It will be understood that the self-tapping screw 94 need not necessarily position the tangs 84 and 86 in immediate engagement of the walls of the apertures 74 and 76. It is sufficient if the proximity of the tangs of the walls will result in the engagement of the tangs with the walls upon yielding of the screw 94 and slight movement of the retractor housing. Furthermore, it will be understood that the positioning device for holding the tangs in position relative the wall of thhe apertures is not limited to a screw. For example, a clip or spring fastener could be provided at the interface between the lower walls of the apertures 74 and 76 and the tang legs 88 to retain the tangs in force transmitting proximity of the upper walls of the aperture.

Furthermore, it will be understood that the invention is not limited to the provision of tangs lanced from the retractor housing and mating apertures provided in the structural member. For example, these anchoring elements could be reversed by providing the integral tangs on the structural member or reinforcement plate therefor and providing the mating apertures in the base wall of the retractor housing. Furthermore, it will be appreciated that the shapes of the mating projection and aperture could take many forms. For example, the male projecting element could have a head which would be received in a key-hole shaped aperture provided on the other member.

Thus, according to the present invention, the improved installation of a belt retractor housing member on a vehicle body structural member includes a male projecting element struck integrally from one of the members and a mating receptacle provided in the other member to receive the male projecting element, and a nonload-bearing positioning means acting to retain the projecting element in load-bearing engagement of the wall of the mating receptacle.

The embodiments of the invention in which an exclusive property or privilege is claimed are defined as follows:

1. In combination, a motor vehicle structural member, a housing member having a seat belt load transmitted thereto, an integral load-bearing male projecting element struck from one of the members, a mating receptacle provided on the other member and having an access opening permitting insertion of the male projecting element thereinto and a load-bearing wall adapted for engagement by the male projecting element to transmit seat belt loads from the housing member to the structural member, and nonload-bearing positioning means acting between the housing member and the structural member to maintain the load-bearing male projecting element of the one member in load-transmitting engagement with the load-bearing wall of the other member whereby the housing member is anchored against movement relative the structural member independently of load-bearing capacity of the positioning means.

2. In combination, a vehicle body structural member having an aperture defined by a load-bearing wall, a seat belt retractor having a housing, a load-bearing tang integral with the retractor housing for insertion through the aperture of the body member, and nonload-bearing positioning means acting between the retractor housing and body member to maintain the load-bearing tang of the retractor housing in load-bearing proximity with the load-bearing wall of the body member to transmit seat belt loads from the retractor frame to the vehicle body structural member independently of load-bearing capacity of the positioning means.

3. In combination, a motor vehicle structural member having a pair of spaced apertures defined by load-bearing walls, a seat belt retractor having a housing, a pair of integral load-bearing tangs lanced from the retractor housing for insertion through the openings of the structural member, and nonload-bearing attaching means acting between the retractor housing and the structural member to maintain the load-bearing tangs of the retractor housing in load-transmitting engagement with the load-bearing wall of the structural member whereby the retractor housing is anchored against movement relative the structural member independently of the load-bearing capacity of the attaching means.

4. In combination, a motor vehicle structural member having an aperture defined by a load-bearing wall, a seat belt retractor having a housing base wall, an integral load-bearing tang struck from the retractor base wall for insertion through the aperture of the structural member, said tang including a first leg extending perpendicularly from the base wall and a second leg extending parallel to the base wall and spaced therefrom, said perpendicular leg adapted to engage the wall of the aperture to transmit force thereto and said parallel wall adapted to overlie the structural member, and nonload-bearing attaching means acting between the housing base wall and the structural member to maintain the load-bearing tang of the housing base wall in load-transmitting engagement with the load-bearing wall of the structural member whereby the housing base wall is anchored against movement relative the structural member independently of load-bearing capacity of the attaching means.

* * * * *